United States Patent
Frost

(10) Patent No.: US 12,367,188 B2
(45) Date of Patent: Jul. 22, 2025

(54) METHOD OF ASSESSING THE VALIDITY OF FACTUAL CLAIMS

(71) Applicant: WHISP LIMITED, London (GB)

(72) Inventor: Luca Jonathan Bailey Frost, London (GB)

(73) Assignee: WHISP LIMITED, London (GB)

( * ) Notice: Subject to any disclaimer, the term of this patent is extended or adjusted under 35 U.S.C. 154(b) by 0 days.

(21) Appl. No.: 18/706,649

(22) PCT Filed: Oct. 31, 2022

(86) PCT No.: PCT/IB2022/060498
§ 371 (c)(1),
(2) Date: May 1, 2024

(87) PCT Pub. No.: WO2023/073671
PCT Pub. Date: May 4, 2023

(65) Prior Publication Data
US 2025/0021543 A1    Jan. 16, 2025

Related U.S. Application Data

(60) Provisional application No. 63/274,109, filed on Nov. 1, 2021.

(51) Int. Cl.
*G06F 16/23* (2019.01)
*G06F 16/35* (2025.01)

(52) U.S. Cl.
CPC ................ *G06F 16/2365* (2019.01)

(58) Field of Classification Search
CPC ............... G06F 16/2365; G06F 16/35
See application file for complete search history.

(56) References Cited

U.S. PATENT DOCUMENTS 8,712,978 B1 * 4/2014 Shilane ............... H03M 7/3091
                                                          707/693
10,956,932 B2   3/2021 Smith et al.
(Continued)

FOREIGN PATENT DOCUMENTS

KR       102135074 B1   7/2020
WO    2020/061578 A1    3/2020

OTHER PUBLICATIONS

Hassan et al. "The quest to automate fact-checking." Proceedings of the 2015 computation+ journalism symposium. 2015.
(Continued)

*Primary Examiner* — Etienne P Leroux
(74) *Attorney, Agent, or Firm* — Nath, Goldberg & Meyer; Joshua B. Goldberg

(57) ABSTRACT

The method of assessing the validity of factual claims determines if a purported factual claim, such as a statement made on social media, in the news, etc., is "true", "false" or "unknown" through comparison with corresponding ranked factual claims stored in a comparison database. The comparison database is assembled by storing a plurality of sets of digital content items, where each of the sets of digital content items has a unique topic. Factual claims within each set are ranked by the number of agreements between individual items within each set. A query item to be assessed is input, and at least one purported factual claim to be assessed is extracted. This purported factual claim is then compared against a predetermined number of highest-ranking factual claims within the corresponding set. A validity score is then generated based on the number of agreements and the number of disagreements from the comparison.

10 Claims, 1 Drawing Sheet

(56) References Cited

U.S. PATENT DOCUMENTS

| | | | |
|---|---|---|---|
| 12,118,306 B2 * | 10/2024 | Chien | G06F 40/30 |
| 2011/0184935 A1 * | 7/2011 | Marlin | G06Q 50/10 |
| | | | 707/719 |
| 2016/0070742 A1 | 3/2016 | Myslinski | |
| 2020/0111014 A1 | 4/2020 | Myslinski | |
| 2020/0202071 A1 | 6/2020 | Ghulati | |
| 2020/0202073 A1 | 6/2020 | Ghulati | |
| 2020/0202074 A1 | 6/2020 | Ghulati | |

OTHER PUBLICATIONS

Karadzhov et al. "Fully Automated Fact Checking Using External Sources." Proceedings of the International Conference Recent Advances in Natural Language Processing, RANLP 2017. 2017.

Miranda et al. "Automated fact checking in the news room." The World Wide Web Conference. 2019.

Majithia et al. "ClaimPortal: Integrated monitoring, searching, checking, and analytics of factual claims on twitter." Proceedings of the 57th Annual Meeting of the Association for Computational Linguistics: System Demonstrations. 2019.

Botnevik et al. "Brenda: Browser extension for fake news detection." Proceedings of the 43rd international ACM SIGIR conference on research and development in information retrieval. 2020.

Mhatre Sanket et al: "A Hybrid Method for Fake News Detection using Cosine Similarity Scores", 2021 International Conference on Communication Information and Computing Technology (ICCICT), IEEE, Jun. 25, 2021 (Jun. 25, 2021), pp. 1-6, XP033959309.

* cited by examiner

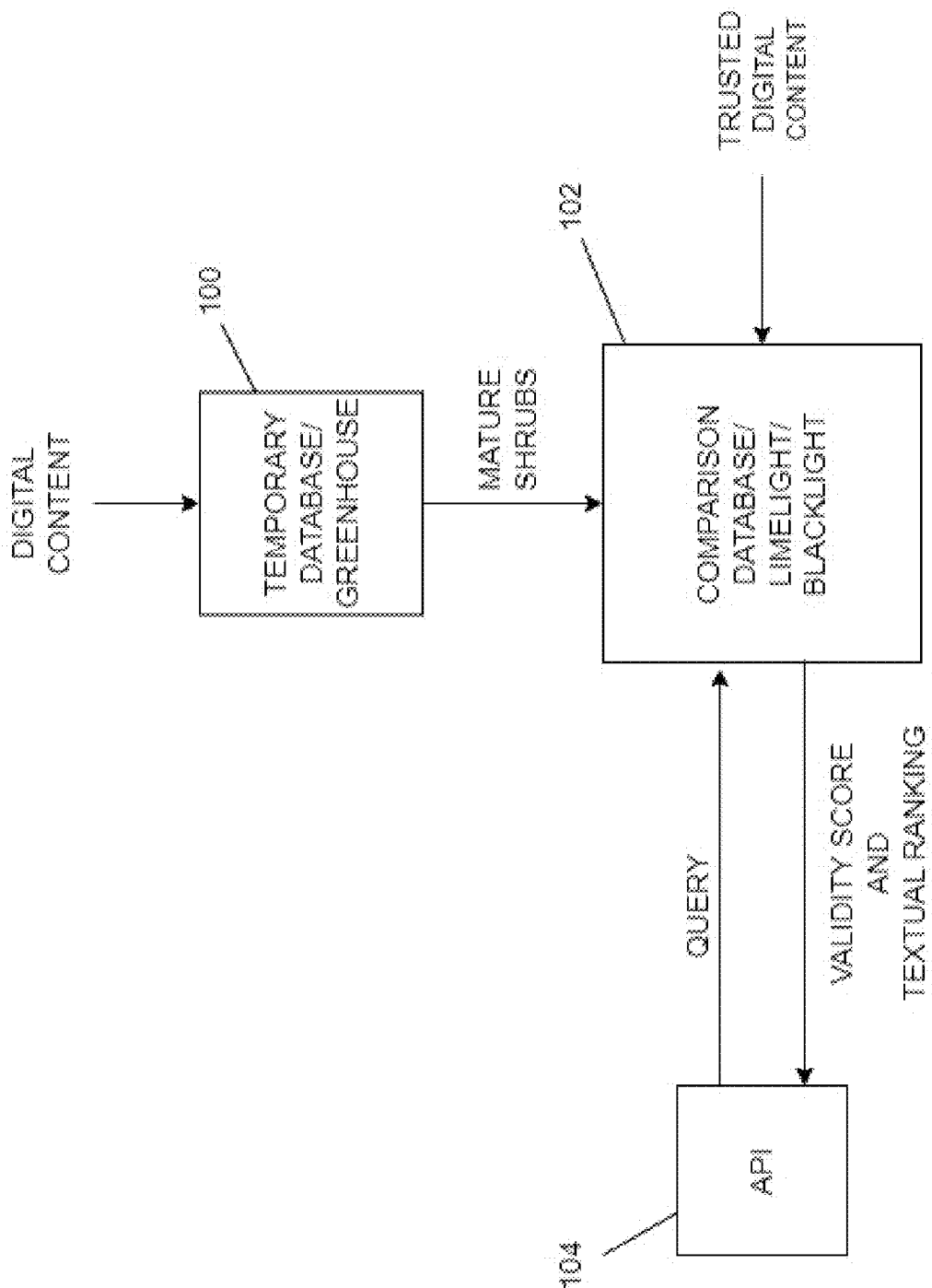

METHOD OF ASSESSING THE VALIDITY OF FACTUAL CLAIMS

CROSS-REFERENCE TO RELATED APPLICATION

This claims the benefit of U.S. Provisional Patent Application No. 63/274,109, filed on Nov. 1, 2021.

BACKGROUND

1. Field

The disclosure of the present patent application relates to assessing the validity of purported factual claims, and particularly to a comparison-based method of determining the statistical validity of a purported factual claim.

2. Description of the Related Art

Due to the rapid sharing of information on the Internet, social media platforms and the like, articles, essays, podcasts, posts, and other digital items containing false or questionable content can rapidly spread. Unlike traditional news sources, which are known to employ fact-checking and can be regarded with some measure of trust, online content often has unknown or misleading origins, thus leaving recipients with questions regarding the veracity of purportedly factual claims. Although automated systems for fact-checking online content exist, such systems are only as accurate as their reference databases, and making use of only trusted reference sources, such as an encyclopedia or a trusted news agency, can be both costly and limited in scope. It would be preferable to be able to apply statistical methods to large numbers of existing pools of freely available information. Thus, a method of assessing the validity of factual claims solving the aforementioned problems is desired.

SUMMARY

The method of assessing the validity of factual claims determines if a purported factual claim, such as a statement made on social media, in the news, etc., is "true", "false" or "unknown" through comparison with corresponding ranked factual claims stored in a comparison database. The comparison database is assembled by storing a plurality of sets of digital content items in computer readable memory associated with the comparison database. Each of the sets of digital content items has a unique topic associated therewith. At least one factual claim is extracted from each of the digital content items within each of the sets of digital content items.

The at least one factual claim of each of the digital content items within each of the sets of digital content items is compared with one or more of the factual claims corresponding to other ones of the digital content items within the same set of digital content items to determine a number of agreements for each of the factual claims within each of the sets of digital content items. The factual claims within each of the sets of digital content items are then ranked by the number of agreements associated therewith. It should be understood that agreement may be either strict agreement or may be based on a measure of similarity. As a non-limiting example, a measure of similarity may be calculated as the dot product of two different vector embeddings.

A query item to be assessed is input, and at least one purported factual claim to be assessed is extracted therefrom. At least one query topic associated with the at least one purported factual claim is determined, and the at least one purported factual claim is compared with a predetermined number of highest-ranking factual claims within at least one of the sets of digital content items corresponding to the at least one query topic to determine a number of query agreements and a number of query disagreements associated with the at least one purported factual claim. A validity score is then assigned to the at least one purported factual claim based on the number of query agreements and the number of query disagreements, and the validity score is displayed to the user. A textual ranking of "true" may be assigned to the at least one purported factual claim when the validity score is within a first predetermined range, a textual ranking of "false" may be assigned to the at least one purported factual claim when the validity score is within a second predetermined range, and a textual ranking of "unknown" may be assigned to the at least one purported factual claim when the validity score is within a third predetermined range. The textual ranking may then also be displayed to the user.

In order to initially form the comparison database, and in order to update the comparison database, the comparison database may work in concert with a temporary database. A plurality of temporary sets of digital content items are stored in computer readable memory associated with the temporary database, and each of the temporary sets of digital content has a unique temporary topic associated therewith. The plurality of temporary sets of digital content items are updated by adding newly-collected digital content items. Each of the temporary sets of digital content items are then merged with corresponding ones of the plurality of sets of digital content items in the comparison database when a predetermined number of digital content items is stored in the respective one of the temporary sets.

When at least one new digital content item is added to at least one of the sets of digital content items, at least one factual claim is extracted from the at least one new digital content item within each of the corresponding sets of digital content items. The comparison and ranking process is then repeated with each new addition within each set; i.e., the at least one factual claim of the at least one new digital content item within each of the corresponding sets of digital content items is compared with one or more of the factual claims corresponding to other ones of the digital content items within the same set of digital content items to determine a number of agreements for each of the factual claims within each of the corresponding sets of digital content items. The factual claims within each of the corresponding sets of digital content items are then re-ranked by the number of agreements associated therewith.

Alternatively, a similar method may be used to assess general consensus between documents. Online documents are located and a location associated with each of the located online documents is stored in a first index. Data content associated with each of the locations stored in the first index is downloaded to generate a set of first data elements. Each of the first data elements is parsed and metadata associated therewith is generated to generate a set of second data elements.

The generation of the metadata associated with each of the first data elements may be a process, such as, but not limited to, named entity recognition, named entity disambiguation, entity linking, coreference resolution, text summarization, vector embeddings, n-gram representations, sentiment analysis, hate speech analysis, and combinations thereof, for example.

Information extraction is applied on each of the second data elements to identify subject, predicate, and object spans associated therewith. The set of second data elements is then stored in a second index, and each of the second data elements is cross-referenced with other ones of the second data elements based on the identified subject, predicate, and object spans using textual entailment. A consensus ranking is then generated for each of the second data elements based on levels of entailment and contradiction with the other ones of the second data elements. The set of second data elements are then transferred to a third index after a pre-set threshold number of consensus rankings have been generated. Additionally, a publisher index may be simultaneously generated which contains a set of publisher names associated with each of the second data elements. A publisher credibility score associated with each of the publisher names is also generated and stored in the publisher index.

These and other features of the present subject matter will become readily apparent upon further review of the following specification.

BRIEF DESCRIPTION OF THE DRAWINGS

The sole drawing FIGURE is a block diagram illustrating data flow in the method of assessing the validity of factual claims.

DETAILED DESCRIPTION OF THE PREFERRED EMBODIMENTS

The method of assessing the validity of factual claims determines if a purported factual claim, such as a statement made on social media, in the news, etc., is "true", "false" or "unknown" through comparison with corresponding ranked factual claims stored in a comparison database. The comparison database is assembled by storing a plurality of sets of digital content items in computer readable memory associated with the comparison database. Each of the sets of digital content items has a unique topic associated therewith. At least one factual claim is extracted from each of the digital content items within each of the sets of digital content items.

The sole drawing FIGURE illustrates digital content flowing into a temporary database 100 before being processed and entering the comparison database 102. The usage of this temporary database 100 (or "greenhouse") will be discussed in greater detail below. It should be understood that the digital content items may be any suitable type of digital media containing text or which is convertible into text. As non-limiting examples, digital content items may be news articles (provided in digital format), digital images which contain, or are appended with, text, podcasts or the like. In the case of non-textual items, such as podcasts, these can be converted using, for example, speech-to-text software. As another non-limiting example, optical character recognition may be performed on a digital image containing text. It should be understood that any suitable type of conversion may be performed, as needed, to convert a digital content item into a purely textual format. As will be discussed in greater detail below, the temporary database 100 and the comparison database 102 are stored in computer readable memory of a larger computer system, and all data processing, such as speech-to-text conversion, etc., is performed by this computer system, which may be a server, a network of servers, a standalone computer, a specialized processor or controller in communication with associated memory, or the like. One of ordinary skill in the art will recognize that such data collection, manipulation, and processing may be performed on any of a wide variety of conventional computer systems.

Following any necessary conversion, the purely textual form of the digital content item is stored and, for reference, the original or "raw" media file may also be stored in a separate database. In order to extract the desired factual claims from the corpus of the text associated with each stored item, and in order to further determine which topic is associated with each extracted factual claim, the text version of each digital content item may undergo any suitable type of processing, such as, but not limited to, linguistic analysis, natural language processing, statistical analysis, contextual analysis, etc.

As a non-limiting example, a relatively large opinion-based article may be analyzed to find any factual claims contained within the entire corpus of the article, such as "penguins are black and white" and "penguins live in Antarctica". Further analysis may then sort these extracted factual claims into their associated topics which, in a further non-limiting example, may be "penguin color" for the first extracted factual claim, and both "penguin color" and "penguin location" for the second extracted factual claim.

The at least one factual claim of each of the digital content items within each of the sets of digital content items is compared with one or more of the factual claims corresponding to other ones of the digital content items within the same set of digital content items to determine a number of agreements for each of the factual claims within each of the sets of digital content items. The factual claims within each of the sets of digital content items are then ranked by the number of agreements associated therewith. It should be understood that agreement may be either strict agreement or may be based on a measure of similarity. As a non-limiting example, a measure of similarity may be calculated as the dot product of two different vector embeddings.

Continuing with the non-limiting example discussed above, within the set associated with the topic "penguin color", the factual claim "penguins are black and white" is compared against all of the other factual claims contained within the set corresponding to "penguin color". In this non-limiting example, there may be 10,000 factual claims extracted from the digital content items in the "penguin color" set, and the comparison may determine that there is agreement between 9,000 of the factual claims that "penguins are black and white". Since each factual claim is compared with all other factual claims within the set, the comparison may also find that there are 500 agreements that "penguins are green"; 250 agreements that "penguins are purple"; 248 agreements that "penguins are blue"; and 2 agreements that "penguins are red". Thus, the ranking within the set "penguin color", from highest to lowest, becomes "penguins are black and white"; "penguins are green"; "penguins are purple"; "penguins are blue"; and "penguins are red". It should be understood that the use of only five ranked factual claims in this example is for purposes of clarity, illustration, and simplification only, and that, in practice, a much larger number of factual claims may be ranked within each set.

A query item to be assessed is input by the user through an application programming interface (API) 104 or the like, and at least one purported factual claim to be assessed is extracted therefrom. At least one query topic associated with the at least one purported factual claim is also determined. As a non-limiting example, the user may input a social media post to be assessed. Similar to the extraction discussed above for the comparison database 102, the query item may also be any suitable type of digital media containing text or which is convertible into text. Similar to that described above, following any necessary conversion, in order to extract the desired purported factual claims from the corpus of the text associated with the query item, and in order to further determine which topic is associated with each extracted purported factual claim, the text version of the query item may undergo any suitable type of processing, such as, but not limited to, linguistic analysis, natural language processing, statistical analysis, contextual analysis, etc.

The at least one purported factual claim is compared with a predetermined number of highest-ranking factual claims within at least one of the sets of digital content items corresponding to the at least one query topic to determine a number of query agreements and a number of query disagreements associated with the at least one purported factual claim. A validity score is then assigned to the at least one purported factual claim based on the number of query agreements and the number of query disagreements, and the validity score is displayed to the user.

As discussed above, with regard to the above non-limiting example, it should be understood that the use of only five ranked factual claims is for purposes of clarity, illustration, and simplification only, and that, in practice, a much larger number of factual claims may be ranked within each set. In this non-limiting example, the predetermined number of highest ranging factual claims may be the three highest-ranking factual claims. In practice, the predetermined number may be much higher. Continuing with the non-limiting example, if the purported factual claim from the user's query item is "penguins are green", then this is compared against the top three corresponding factual claims: "penguins are black and white" (9,000 agreements); "penguins are green" (500 agreements); and "penguins are purple" (250 agreements). In this non-limiting example, the highest ranked "penguins are black and white" clearly has many more agreements than "penguins are purple" (18 times more agreements), thus the validity score for the user's purported factual claim that "penguins are purple" would be relatively low. It should be understood that the validity score may be calculated using any suitable method, including any suitable type of weighting and/or statistics. As a non-limiting example, a simple validity score may be calculated solely from the percentage of agreements corresponding to the purported factual claim. In this non-limiting example, that percentage is 500 agreements out of 10,000 factual claims, or 5%. This validity score is then presented to the user as an indicator of how valid the purported factual claim from the input source is likely to be.

Rather than presenting the raw validity score to the user, or in addition to presenting the raw validity score to the user, a textual ranking of "true" may be assigned to the at least one purported factual claim when the validity score is within a first predetermined range, a textual ranking of "false" may be assigned to the at least one purported factual claim when the validity score is within a second predetermined range, and a textual ranking of "unknown" may be assigned to the at least one purported factual claim when the validity score is within a third predetermined range. The textual ranking may then be displayed to the user. As a further non-limiting example, a validity score of 85% or more may be determined to be "true"; a validity score of up to 15% may be determined to be "false"; and a validity score ranging between 15% and 85% may be determined to be "unknown", with the numerical validity score providing more detailed statistical information. Thus, for example, if a user query returns a validity score "unknown", the user can make a broad determination of possible validity based on whether, for example, the unknown ranking has a validity score of 84% compared to an unknown ranking with a validity score of 16%.

In certain situations, due to the proliferation of misinformation, one or more sets may contain very highly ranked factual claims which are not true. Using the above non-limiting example, posts discussing penguins being orange may become very popular on social media and then be picked up by news agencies. For example, an animated cartoon featuring an orange penguin may become very popular, and a large number of articles and social media posts regarding orange penguins may be collected. In such an exemplary scenario, as digital content items are collected for the comparison database, the extracted factual claim "penguins are orange" may end up with a very high number of agreements despite being an item of misinformation.

In order to correct for such false rankings of information, factual claims taken from trusted sources of information may be used to supplant the highest ranked factual claim produced by the above-described process. As a non-limiting example, a trusted encyclopedia, a trusted news agency, or the like may be used as sources of trusted digital content items, and following the above non-limiting example, if one of these trusted digital content items yields the factual claim that "penguins are black and white", this factual claim will automatically become the highest ranked factual claim within the "penguin color" set. An artificially high number of "agreements" may be associated with this factual claim, or any other suitable type of weighting and/or sorting scheme may be used such that this factual claim is recognized as the highest ranked factual claim.

In order to initially form the comparison database 102, and in order to update the comparison database 102, the comparison database 102 may work in concert with a temporary database 100, as noted above. A plurality of temporary sets of digital content items can be stored in computer readable memory associated with the temporary database 100, and each of the temporary sets of digital content has a unique temporary topic associated therewith. The plurality of temporary sets of digital content items are updated by adding newly-collected digital content items. A "bot", "web crawler" or any other suitable type of program, algorithm or the like may gather digital content items from the Internet, social media platforms, blogs, podcast hubs, etc. to automatically form and update the temporary sets of digital content items. It should be understood that any suitable type and number of filters may be applied as dictated by the specifics of any issue being analyzed such that the collecting and storage of the temporary sets of digital content items can be customized and controlled.

Each of the temporary sets of digital content items are then merged with corresponding ones of the plurality of sets of digital content items in the comparison database 102 when a predetermined number of digital content items is stored in the respective one of the temporary sets. As a non-limiting example, digital content items may constantly be gathered from news sources, social media posts, podcasts and the like, and these digital content items are converted and analyzed, as discussed above, to be sorted by topic. Once each temporary set associated with a topic reaches a predetermined number of digital content items, such as, for example, 10,000 items, the temporary set is transferred from the temporary database 100 to the comparison database 102, where the items are merged into the corresponding set in the comparison database 102.

When at least one new digital content item is added to at least one of the sets of digital content items, at least one factual claim is extracted from the at least one new digital content item within each of the corresponding sets of digital content items. The comparison and ranking process is then repeated with each new addition within each set; i.e., the at least one factual claim of the at least one new digital content item within each of the corresponding sets of digital content items is compared with one or more of the factual claims corresponding to other ones of the digital content items within the same set of digital content items to determine a number of agreements for each of the factual claims within each of the corresponding sets of digital content items. The factual claims within each of the corresponding sets of digital content items are then re-ranked by the number of agreements associated therewith.

As a non-limiting example of the process flow, a news article is discovered by a web crawling system and at least the location of the article (e.g., a URL) is stored in an initial index. For purposes of forming an illustrative and clarifying analogy, this article may be referred to as a "seed" and the basic information for this "seed" is stored in what may be referred to as a "limbo" index. Each seed stored in the limbo index may be assigned a priority for processing. Once selected for processing, the contents associated with the URL are downloaded, parsed, and then structured meaning is added via natural language processing (NLP) and machine learning (ML) techniques. It will be recognized by one of ordinary skill in the art that language processing, including parsing, context assignment, sentence extraction, etc. is well known in the art and that any suitable such techniques may be used. The limbo index serves as a data buffer, handling all content that requires processing, regardless of its destination.

As discussed above, processing of each seed is based on a priority value assigned to the seeds. The priority value may be a numerical value indicating importance, which may be based on, for example, a time perspective, of the seed. It should be understood that the seed itself is relatively light in terms of data. For example, the seed may belong to one of two "species": "URL" or "text". A seed with a text species indicates that the content of the seed is unstructured text. A seed with a URL species indicates that the content of the seed is a URL that will need to be downloaded, scraped, etc. in the future. The "payload" of the seed may be a simple string field that contains the content of the seed as defined by its species.

At this stage, the textual content of the "seed" is annotated with generated metadata associated with the seed. Dependent upon the ultimate needs of the user, it should be understood that any suitable type of processing and/or metadata generation may be implemented. Non-limiting examples of such metadata generation include named entity recognition through a pre-trained language model, named entity disambiguation, entity linking (e.g., by extraction of structured content from articles), coreference resolution, text summarization, vector embeddings, n-gram representations, sentiment analysis, and hate speech analysis. It should be understood that any suitable type of artificial intelligence algorithm, machine learning algorithm, or the like may be employed for this processing of the seed.

Following the processing described above, the "seed" now develops into a fuller data structure which may be termed a "sprout". The seed included only the most basic information regarding the article (e.g., its URL). The associated sprout includes all the information developed during the processing step described above, including identified entities (e.g., specific names and locations discussed in the article) and the results of subject-predicate-object (SPO) extraction. For example, if the article contains the sentence "Trump withdrew his sponsorship after the second Tour de Trump in 1990 because his business ventures were experiencing financial woes," then the "sprouting" process results in extraction of the entity "Trump" and SPO extraction produces a "stem" belonging to each "sprout". In this example, "Trump withdrew his sponsorship" is an identified stem resulting from the SPO extraction on the sprout.

The "sprouting" process transforms unstructured text into a uniform format, thus facilitating like-for-like comparison/ examination using textual entailment, for example. Once this processing is complete, the sprout is either passed into the temporary database 100, as will be discussed in detail below, or may be delivered to the user interface 104 directly for on-the-fly comparison of data in a uniform format. The sprout at this stage is a "parent" document that holds metadata relating to the content in question, alongside references to extracted stem(s) and a link to the publisher responsible for the content. Each stem is a "child" document that contains extracted SPO triples from the stem, with reference to the position of the SPO triple within the text (e.g., via index position). The publisher of each sprout is automatically resolved, typically based on a URL. The system may also build a publisher index, allowing publishers to be easily tracked. By building the publisher index, the URL of the source can be reduced to a second-level domain and TLD (e.g., "http://edition.cnn.com" simply becomes "cnn.com") in order to query the publisher index.

As discussed above, following the metadata generation processing on the seed, information extraction is used to identify "subject", "predicate", and "object" (SPO) spans of the text. Each of these SPOs forms a "stem" belonging to the sprout, which retains the metadata generated during the metadata generation processing stage of the seed. It is noted that because SPOs are modelled as argument-relation-argument, a knowledge graph (KG) can be built with subjects and objects as nodes, and predicates as edges. This knowledge graph can be built upon by other documents across the database to build a larger graph of structured data.

As discussed above, prior to placement in the comparison database 102, temporary sets of digital content items are collected. In the present example, each sprout is analyzed and then placed into a temporary set of digital content items; i.e., temporarily collected with other sprouts. In the illustrative and clarifying analogy, at this stage, each sprout has now developed into a "shrub" and the temporary collection of data is a "greenhouse", where each stem of each shrub is cross-referenced with those from other sources. This is the consensus-building process which forms the basis for the eventual rankings of the comparison database 102. Each shrub stem is passed to a textual entailment (TE) model to produce this consensus, after which the validity score can be determined based on the entailment metrics and publisher validity metrics discussed above. When the temporary collection of data (all pertaining to the same topic) reaches a pre-defined threshold (such as the total number of stems), the data set is relocated in to the comparison database 102, which may be referred to as the "limelight" index (part of the comparison database 102), where the contents are made publicly-accessible, allowing the contents to be used for producing validity scores for user queries entered through the API 104 or the like.

The "greenhouse" index is the temporary database 100 where the sprouts are clustered into a "series"; i.e., a collection of shrubs pertaining to the same topic. This allows the system to recursively measure textual entailment (TE) between all relevant stems in a series. Following each TE calculation, a validity score may be produced. From a data integrity perspective, a "shrub" is a more complete version of a "sprout", since each shrub is associated with a series, and all stems of the shrubs have been recursively evaluated (to produce validity scores) against relevant stems from other shrubs in the series. The greenhouse 100 is a non-public index, thus queries made by the user at the interface level have no access to the artifacts in the greenhouse 100. The temporary database 100 is referred to in this analogy as a "greenhouse" because it provides an interim storage index for the system to "grow" consensus (or contention) between the various shrubs in a given series.

The validity score may be calculated as a number between, for example, −1.00 and +1.00 inclusive. As discussed above, the validity score indicates the outcome, from a truth perspective, of a given consensus calculation. If the highest textual entailment (TE) value is entailment, then the validity score is a positive number. If the highest TE value is a contradiction, then the validity score is a negative number. If the highest TE score is neutrality, then a validity score is not calculated. As discussed above, these scores may be converted into percentage values. Depending on the polarity of the validity score, a merit field may also be included. When the validity score is positive, the merit is always set to "true"; i.e., that it affects a particular shrub publishers' mean validity score. However, when the validity score is negative, the merit is set to a value corresponding to the lower ranked publisher (of more than one publisher), thus affecting only one publisher's mean validity score.

At the point where enough validity scores have been calculated (according to a predetermined threshold), the shrub is considered "mature" and made visible. Maturity is measured at both the series and shrub levels, i.e., the greenhouse 100 can contain series whose children include mature shrubs, but have not met the threshold at which the shrub can be considered mature. Once a full series has reached maturity, it is moved to the public index; i.e., the comparison database 102.

The comparison database 102 may include two separate public indices, which may be referred to as the "limelight" and "blacklight" indices. It is noted that these indices are not static; i.e., a series may be marked "mature" and relocated from the greenhouse 100, however, it can still grow and develop further. For example, a sprout may exit processing, and its "best match" series may reside in the limelight index. In such an instance, the sprout (and all child artifacts/documents) would be moved to this series and marked as hidden. Then, consensus-building would take place, before the sprout is re-graded as a shrub and becomes visible.

The limelight and blacklight indices are functionally analogous areas of data storage. Both indices are public-facing (i.e., their contents can be queried and returned by the user interface 104). Generally, the content of the blacklight index will very closely mirror that of the limelight index, however, the existence of dual public endpoints allows the system to A/B test functionality and processes. Typically, the contents of the limelight index will always be favored over the blacklight index unless A/B testing or similar functionality is occurring.

As discussed above, sprouts remain in the greenhouse index while their stems are built. A sprout is re-graded to a shrub when clustered among peers. The shrub's stems are compared against other shrubs' stems in the same cluster using textual entailment in order to gauge the level of consensus for the $n^{th}$ claim in a given cluster. As a non-limiting example, the textual entailment may be augmented using natural language processing (NLP) techniques. As a further non-limiting example, augmentation of the textual entailment models may be performed with a subject-predicate-object (SPO) structure, where subjects and objects can be recognized as unique entities (with reference to a knowledge base). Using this technique, two sentences with the same subject and object entities, but with varying wording, may be compared solely upon the degree to which their verb/predicates are related. A similarity/relatedness metric may be based on an ontological representation of English verb lemmas, stratified by levels of simplification. As a non-limiting example of this technique, the verb "announced" is considered, which is the inflected past participle of the lemma "ANNOUNCE", which may fall into a discrete category "SAY" after a method of simplification/reduction.

The API 104 may be a serverless function application, providing a RESTful interface (i.e., an interface that two computer systems use to exchange information securely over the internet) for measuring consensus between a received document and data in the limelight/blacklight indices, then querying the publisher index to determine the validity (or lack thereof) of the query. While the API 104 exists as a separate system to the main system where data collection and processing takes place, the two will often interact with one another.

With regard to the validity score calculation, all calculations are performed on a like-for-like basis. If the API 104 receives a textual claim to assess, for example, it will be passed to the main system as a seed with high priority. Once processed, the claim becomes a sprout with one or more stems. Simultaneously with the seed-to-sprout processing described above, the claim is inserted into an Elasticsearch query, for example, against the limelight/blacklight indices to identify relevant series, shrubs and stems for comparison.

Once the claim has been processed and takes shape as a sprout, all stems are fed to a textual entailment model to produce a matrix of entailment, neutrality, and contradiction for all stems identified as salient by the query. All entailment results where neutrality is the greatest value are dropped, as these results are not pertinent. Finally, stems and their respective entailment scores are used to calculate validity scores. The manner in which this takes place depends upon the species. If the species is "text" where a URL exists and a given publisher can be tracked, then the validity score is calculated as follows: if the highest textual entailment (TE) value is entailment, then a validity score of "entailment*higher of both publishers" is awarded and the validity score is changed to a positive number. If the highest TE value is a contradiction, then a validity score of "contradiction*lower of two publishers" is awarded and the validity score is changed to a negative number. In all other cases, where a stem is a simple "claim", then the API 104 will query the most semantically-similar stems and produce validity scores based upon only one publisher's average validity score.

As an alternative embodiment, rather than producing a validity score, a similar technique may be used to produce a credibility score, particularly with regard to the credibility of publishers. In this embodiment, publishers are associated with all shrubs, sprouts, stems and seeds that emanate from a domain known to be associated with a particular publisher. A third-party service, as a non-limiting example, may be used to obtain metadata associated with a publisher's URL. As a non-limiting example, "nytimes.com" may be used as an input, with a metadata output of "name: New York Times, locale: en_US, logo_image: https:// . . . , etc."

A relatively small group of verified organizations (e.g., well known and trusted news organizations) may be designated as Zero-Rated Publishers (ZRPs), whose credibility scores are determined based upon one or more of the following factors: automated publisher credibility estimation; age of the domain; location determination; Freedom House's Country Report (sum of civil liberties criteria D1-D4; i.e., 8/12); aggregate statistics on metadata for all their associated digital content items (shrubs, stems, etc.); added factors considered when a publisher is zero-rated; and publisher review by a journalistic credibility specialist. ZRPs represent the only source of ground truth within the application, and due to strict criteria, the system considers their information to be axiomatic; i.e., there will be a trickle-down effect when ZRP stems are examined against non-ZRP stems.

When an API request is received, a credibility score may be calculated by one of two ways: a) a top-down approach, where all shrub.stems for a given publisher are set to a predetermined credibility score, since the publisher in question is a zero-rated publisher (ZRP); or b) a bottom-up approach, where the shrub.stems' credibility scores are calculated as a product of textual entailment (TE) output, weighted by a publisher's mean credibility score. In the latter bottom-up approach, if the highest textual entailment value is entailment, then a credibility score of "entailment*higher of both publishers" would be awarded. In this case, the credibility score would be changed to a positive number. However, if the highest TE value is contradiction, then a credibility score of "contradiction*lower of two publishers" would be awarded. In this case, the credibility score will be changed to a negative number. Depending on the polarity of the credibility score, a merit field is also included. When the credibility score is positive, merit is always set to "true" and will always affect a shrub.publisher's mean credibility score. However, when the credibility score is negative, merit is set to the publisher_id of the lower of the two publishers and only one publisher's mean credibility score will be affected.

It should be understood that the above processes and calculations may be performed by any suitable computer system. Data may be entered into the computer system via any suitable type of user interface, and may be stored in computer readable memory, which may be any suitable type of computer readable and programmable memory, and is preferably a non-transitory, computer readable storage medium. Calculations may be performed by a processor, which may be any suitable type of computer processor, and may be displayed to the user on one or more displays, each of which may be any suitable type of computer display.

The processor may be associated with, or incorporated into, any suitable type of computing device, for example, a personal computer or a programmable logic controller. For each display(s), the processor, the memory and any associated computer readable recording media may be in communication with one another by any suitable type of data bus, as is well known in the art.

Non-limiting examples of computer-readable recording media include non-transitory storage media, a magnetic recording apparatus, an optical disk, a magneto-optical disk, and/or a semiconductor memory (for example, RAM, ROM, etc.). Non-limiting examples of magnetic recording apparatus that may be used in addition to the main memory, or in place of the main memory, include a hard disk device (HDD), a flexible disk (FD), and a magnetic tape (MT).

Non-limiting examples of the optical disk include a DVD (Digital Versatile Disc), a DVD-RAM, a CD-ROM (Compact Disc-Read Only Memory), and a CD-R (Recordable)/RW. It should be understood that non-transitory computer-readable storage media include all computer-readable media, with the sole exception being a transitory, propagating signal.

It is to be understood that the method of assessing the validity of factual claims is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A method of assessing the validity of factual claims, comprising the steps of:
    assembling a comparison database, wherein the step of assembling the comparison database comprises:
        storing a plurality of sets of digital content items in computer readable memory associated with the comparison database, wherein each of the sets of digital content items has a unique topic associated therewith;
        extracting at least one factual claim from each of the digital content items within each of the sets of digital content items;
        comparing the at least one factual claim of each of the digital content items within each of the sets of digital content items with one or more of the factual claims corresponding to other ones of the digital content items within the same set of digital content items to determine a number of agreements for each of the factual claims within each of the sets of digital content items; and
        ranking the factual claims within each of the sets of digital content items by the number of agreements associated therewith;
    extracting at least one purported factual claim to be assessed from a query item;
    determining at least one query topic associated with the at least one purported factual claim;
    comparing the at least one purported factual claim with a predetermined number of highest-ranking factual claims within at least one of the sets of digital content items corresponding to the at least one query topic to determine a number of query agreements and a number of query disagreements associated with the at least one purported factual claim;
    assigning a validity score to the at least one purported factual claim based on the number of query agreements and the number of query disagreements; and
    displaying the validity score to a user.

2. The method of assessing the validity of factual claims as recited in claim 1, wherein the number of agreements for each of the factual claims is based on similarity between the factual claims.

3. The method of assessing the validity of factual claims as recited in claim 1, further comprising the steps of:
    adding at least one new digital content item to at least one of the sets of digital content items;
    extracting at least one factual claim from the at least one new digital content item within each of the corresponding sets of digital content items;
    comparing the at least one factual claim of the at least one new digital content item within each of the corresponding sets of digital content items with one or more of the factual claims corresponding to other ones of the digital content items within the same set of digital content items to determine a number of agreements for each of the factual claims within each of the corresponding sets of digital content items; and re-ranking the factual claims within each of the corresponding sets of digital content items by the number of agreements associated therewith.

4. The method of assessing the validity of factual claims as recited in claim 3, wherein the number of agreements for each of the factual claims is based on similarity between the factual claims.

5. The method of assessing the validity of factual claims as recited in claim 1, further comprising the steps of:

assigning a textual ranking of true to the at least one purported factual claim when the validity score is within a first predetermined range, assigning a textual ranking of false to the at least one purported factual claim when the validity score is within a second predetermined range, and assigning a textual ranking of unknown to the at least one purported factual claim when the validity score is within a third predetermined range; and displaying the textual ranking to the user.

6. The method of assessing the validity of factual claims as recited in claim 1, wherein the step of assembling the comparison database further comprises:

storing a plurality of temporary sets of digital content items in computer readable memory associated with a temporary database, wherein each of the temporary sets of digital content has a unique temporary topic associated therewith;

updating the plurality of temporary sets of digital content items by adding newly-collected digital content items; and merging each of the temporary sets of digital content items with corresponding ones of the plurality of sets of digital content items in the comparison database when a predetermined number of digital content items is stored in the respective one of the temporary sets.

7. A method of assessing consensus between documents, comprising the steps of:

locating online documents and storing a location associated with each of the located online documents in a first index;

downloading data content associated with each of the locations stored in the first index to generate a set of first data elements;

parsing each of the first data elements and generating metadata associated therewith to generate a set of second data elements;

applying information extraction on each of the second data elements to identify subject, predicate, and object spans associated therewith;

storing the set of second data elements in a second index;

cross-referencing each of the second data elements with other ones of the second data elements based on the identified subject, predicate, and object spans using textual entailment;

generating a consensus ranking for each of the second data elements based on levels of entailment and contradiction with the other ones of the second data elements; and transferring the set of second data elements to a third index after a pre-set threshold number of consensus rankings have been generated.

8. The method of assessing consensus between documents as recited in claim 7, wherein the step of generating metadata associated with each of the first data elements is a process selected from the group consisting of named entity recognition, named entity disambiguation, entity linking, coreference resolution, text summarization, vector embeddings, n-gram representations, sentiment analysis, hate speech analysis, and combinations thereof.

9. The method of assessing consensus between documents as recited in claim 7, further comprising the step of generating a publisher index containing a set of publisher names associated with each of the second data elements.

10. The method of assessing consensus between documents as recited in claim 9, further comprising the step of generating a publisher credibility score associated with each of the publisher names stored in the publisher index.

* * * * *